Figure 1:
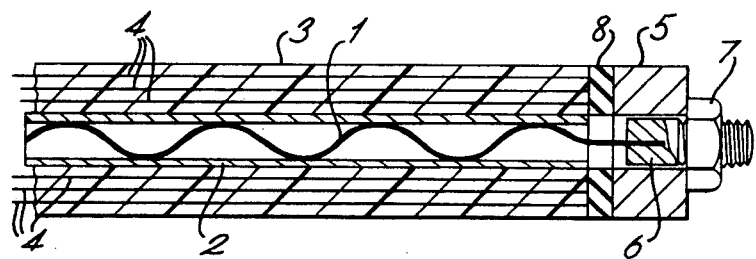

United States Patent [19]

Morley

[11] 4,065,903
[45] Jan. 3, 1978

[54] FIXATION AND/OR SUPPORT MEANS

[75] Inventor: John Godfrey Morley, Little Eaton, England

[73] Assignee: National Research Development Corporation, London, England

[21] Appl. No.: 635,783

[22] Filed: Nov. 28, 1975

[30] Foreign Application Priority Data

Dec. 3, 1974   United Kingdom .............. 52249/74

[51] Int. Cl.² ........................... E04B 1/38; E04C 3/10
[52] U.S. Cl. .......................................... 52/704; 52/27;
52/230; 52/309.2; 52/513; 52/734; 403/80;
403/206; 403/406; 403/408
[58] Field of Search ................ 52/704, 705, 27, 309.2,
52/734, 736, 513, 698, 223 R, 223 L, 230;
85/64, 5 R; 403/52, 80, 260, 406, 408

[56] References Cited

U.S. PATENT DOCUMENTS

| | | | |
|---|---|---|---|
| 806,406 | 12/1905 | Farrington | 52/705 X |
| 2,456,330 | 12/1948 | Scott | 403/52 |
| 2,921,463 | 1/1960 | Goldfein | 52/223 R |
| 3,160,988 | 12/1964 | Williams | 52/714 |
| 3,355,357 | 11/1967 | Sage | 52/230 X |
| 3,478,640 | 11/1969 | Elders | 85/64 |
| 3,864,051 | 2/1975 | Reid | 403/406 |

FOREIGN PATENT DOCUMENTS

| | | | |
|---|---|---|---|
| 1,251,505 | 10/1967 | Germany | 52/223 R |
| 1,331,431 | 9/1973 | United Kingdom | 52/734 |

*Primary Examiner*—Alfred C. Perham
*Attorney, Agent, or Firm*—Cushman, Darby & Cushman

[57] ABSTRACT

Fixation of an artefact to a support means, such as of cement panels as exterior cladding for buildings, a reinforced plastics compressor blade or a ceramic turbine blade to a rotary hub member, or of an electric insulator of longitudinally reinforced plastics material to a transmission tower, the artefact being subject at least at times to longitudinal shear stresses, is effected through duplex fibre means, whereby the stresses are transferred to the support means through the duplex fibre means.

1 Claim, 2 Drawing Figures

FIXATION AND/OR SUPPORT MEANS

This invention relates to fixation and/or support means, more especially for the fixation or support of artefacts formed from brittle materials with somewhat low failing strains or from unidirectionally, or substantially unidirectionally, fibre reinforced composite materials. Although such unidirectional fibrous materials can be designed to have very good tensile properties in the direction of the fibres, the longitudinal shear strengths of the materials will depend to a large extent on the properties of the matrix material and of the interface between fibres and matrix; the shear strengths may be very poor. Thus there is a fundamental problem with fibre reinforced composite materials although they can show major mechanical advantages if the reinforcement is substantially unidirectional. Poor shear strengths also arise with brittle materials, such as concrete and possibly glass fibre reinforced cements.

Since the fixations or supports for any of these materials must involve the imposition of shear forces there has been difficulty in providing for transfer of these shear forces. Thus it has been the practice to spread the stresses over a larger area of material to reduce the local intensity by increasing the area of contact between the artefact and the fixing or support means. This, however, leads to an increase of volume of the artefact without benefit to the actual use of it. Moreover, such increase of volume, by reason of increased overall mass, can not only lead to higher costs and increases in the stresses themselves but, in certain cases, can lead to design difficulties in view of the necessity of accommodating the extra volume involved. Thus, certain plastics materials, particularly fibre reinforced polymer materials, are particularly useful for the formation of, say, large axial flow compressor rotor blades for aerospace engines and although the polymer materials themselves are usually brittle, the fibre reinforcement, be it glass or carbon or other fibre, can be arranged to enable the composite to withstand the longitudinal forces to which the blades themselves are subjected due to centrifugal forces in use. However, fixation of the blades presents a problem since the geometry of the blades themselves requires complication at the blade root in order to disperse the fixation stresses which develop during rotation. Normally such complication takes the form of the provision of unduly large blade roots which, in consequence, entail large hub size, weight and overall dimensions of the compressor. Similar considerations apply to the mounting of ceramic turbine blades.

In accordance with the invention, a fixation and/or support means for an artefact which is at least at times to be subjected to longitudinal shear stress, comprises duplex fibre means through which said stresses are transferred from said artefact to said fixation or support means.

The duplex fibre means essentially involves a core member of elongated sinuous or helical form which is bonded interfacially to the wall of an elongated hole in the artefact itself or to the inner wall of a tube member which is fixed to the artefact, the core member being fixed at or towards one end to the fixation or support means.

Duplex fibre is described, for example in U.K. patent specification No. 1,331,431 and further, in a form especially suitable for use in fixation/support means in accordance with the invention, in the specifications accompanying U.K. patent application Nos. 4060/72 and 4061/72.

Thus when duplex fibre means is used as a stress transfer link the maximum shear stress developed in the artefact due to fixation/support forces, can be controlled by the geometry of the core member of the duplex fibre means; that is, the maximum shear stress which can be developed where the duplex fibre means joins the artefact can never rise above a preset limit which is, of course, chosen to lie within the known strength limitations of the material of the artefact. This stress transfer arrangement can provide a self-controlled shear stress transfer mechanism which has an overall capacity of tensile deformation under overload conditions.

An advantage of the stress transfer arrangement in accordance with the invention may be that the duplex fibre means may contribute to longitudinal reinforcement of an artefact made from a unidirectional composite material, as will be understood. Then stress transfer may be spread over a comparatively large internal area of the artefact. In any event, use of the invention enables the transfer stresses in the material of the artefact to be held to a level below the maximum which the material can withstand and yet not require the volume of the artefact to be substantially greater than that necessary for fulfilling its essential purpose.

The fixation or support means proper may then be of such form and material as may best suit the particular conditions of the design. Thus, if the artefact is a compressor blade, the root member, which is the fixation means proper for the blade portion, may be of metal and therefore of normal size whereas the blade portion, itself of normal size, may be a brittle reinforced polymer which is much lighter than metal. By arranging for one part of the duplex fibre means to be fixed relative to the blade portion, such as by encapsulation within the matrix, and the other part to be fixed relative to the root portion, such as by mechanically anchoring it to the root portion, the stress transfer has to take place between the blade portion and the root portion through the core of the duplex fibre means.

The rate of stress transfer can be arranged to be controlled by the geometry of the duplex assembly so that the stress can be transferred over any desired volume of the blade portion, thus avoiding local stress concentrations and subsequent local failure. Moreover, more than one duplex fibre means may be provided for the artefact. If the blade portion is reinforced with fibre aligned substantially with the radial axis of the blade which is required to meet the conditions of use, then the duplex fibre portion within the blade portion is preferably substantially similarly aligned so as to obtain maximum stress transfer efficiency. Should the whole blade/root assembly be strained beyond its engineering design limit, fracture should not occur because then all that should happen is that the parts of the duplex fibre would move relative to each other in the accepted manner for such fibre. This, also, applies to any artefact in which such alignment occurs; moreover, the invention is not confined only to those artefacts in which alignment between duplex fibres and reinforcement fibre occurs.

It will be clear that the invention is applicable to many other situations and that compressor blade fixation is merely one example. A somewhat similar application is to supports for helicopter rotor blades. Other examples are the attachements of metal end fixations to glass fibre reinforced polymer electrical insulators for suspending high tension cables from pylons; use of the invention here avoids the necessity for additional cross plies of reinforcing fibres and, in consequence, also avoids the imposition of increased weight and cost. Using duplex fibre means in accordance with the present invention these insulators may be fabricated as unidirectional laminates in which the duplex fibre means is substantially aligned with the reinforcing fibre.

Yet again, the invention provides a solution to the problem of attachment of fittings to reinforced plastics boats, the fixation being considered in the sense of the invention as being of the boat to the fitting.

In order that the invention may be more clearly understood, two embodiments thereof will now be described with reference to the accompanying somewhat diagrammatic drawings.

Figure 2:
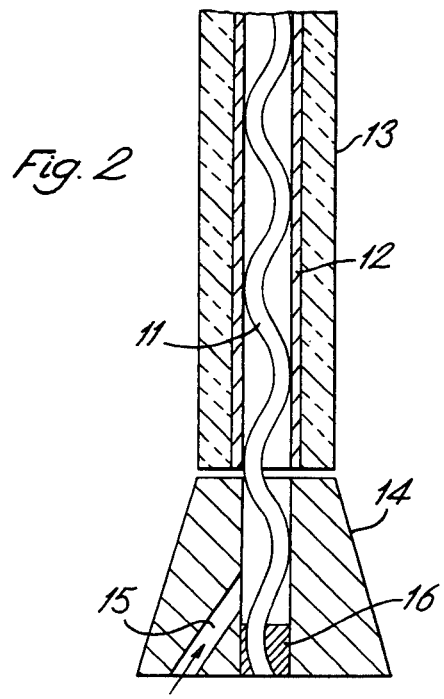

FIG. 1 illustrates the use of the invention in a fixation for an electric insulator while FIG. 2 concerns fixation of a high temperature ceramic turbine blade.

In FIG. 1, the convoluted steel wire 1 and enveloping steel tube 2 form a duplex fibre means, the tube being embedded in matrix 3 of an insulator parallel to the reinforcing fibre 4 in the matrix. The number of duplex units required in any particular system will depend upon the degree of stress to be resisted and also upon the characteristics of the duplex fibre means, as will be well understood. The inner member 1 of the or each duplex fibre means is secured at its free end to a metal block 5 by being brazed or otherwise fixed in a bolt member 6 which passes through the block 5 and is engaged by nut 7. The inner member 1 is tensioned by means of the nut 7 and the stress transfer from the insulator body to the metal block 5 takes place through the tube member 2 and the frictional interface to the inner member 1 and the bolt member 6, a rubber gasket 8 being provided, if desired, to maintain a weatherproof seal between the block 5 and the insulator body. The fixing block 5 can be of any suitable form permitting of attachment to a pylon by conventional means.

If the insulator assembly should be strained beyond its elastic limit, the inner members 1 being partly withdrawn from the tubes 2 against frictional losses, the assembly could be restored to its original geometry by use of the bolt 6 and nut 7. In any event the load limiting feature can be arranged to prevent the load carried by the insulator body rising above the design limit. On the other hand if no adjustment is required the member 1 can be permanently fixed directly to the metal block 5.

Similar considerations may be applied to the design of, say, lightweight, fibre reinforced plastics bridge structures or like scaffold type structures which could be assembled on site from kits of parts; the metal blocks could form convenient attachment points which could be joined together by conventional nuts and bolts to join parts of the structure or to anchor them. Attachment of a metal block to a fibre reinforced plastic structure in accordance with the invention can be amply efficient and only a unidirectional fibre assembly will be suitable for a unidirectional tensile loading. Moreover, since the metal block and other fixings need form only a very small part of the total structure, these can be made of stainless steel or other rustproof material without undue cost. Thus as the reinforced plastics structure is weatherproof, maintenance costs could probably be reduced, with little, if any, extra cost over those of equivalent conventional unit bridge or scaffold type structures.

Referring now to FIG. 2, which is a diagrammatic sectional view of a fixation for a high temperature gas turbine blade, part of the blade which is ceramic is indicated at 13, the ceramic being moulded or otherwise formed on a tube 12 with which the sinuous core member 11 forms a tube/core duplex unit. The root end of the core member is fixed to a metal blade root member 14 by welding, brazing or by other similar means. The blade root member can be of conventional form. Alternatively provision may be made for prestressing the core member, if desired, in similar manner to that shown in FIG. 1, for example, by means of a nut and screw termination. Such a construction may also be of use where the material of the blade is not a ceramic but a metal which is too brittle for monolithic association with a root portion. However, both here and in the case of a ceramic blade, arrangements may be made for cooling air to be circulated through the tube; a feed hole 15 may be provided in the root portion through which the cooling air may pass from a supply in the turbine wheel disc, not shown but which grips the blade root 14 in known manner. Suitable other means may be provided alternatively for supply of air to the blade. It should be noted that, if the material of the blade itself is suitable, there may be no necessity to provide the intermediate tube member since, in that case, the core member can react against the wall of the hole in the blade.

It is probable that, in the context of blade fixation, a plurality of duplex fibre means may be required and these will be distributed over the blade to the best advantage. In view of the curvature of the blade section, it is possible that non-planar disposition of the duplex units would be such as to provide lateral stability. However, it may be necessary to provide more than one line of duplex units to ensure lateral stability in view of the appreciable bending forces due to gas forces on the blades of a turbine or, indeed, air forces in a compressor. It is evident that even the single line system can accept some lateral deflection by reason of the use of duplex devices.

It will be evident that it will be necessary to select materials for the duplex units which will withstand the temperatures involved but cooling as mentioned above may serve to alleviate the problem of choice of suitable materials in the case of high temperature operation.

It is to be noted that a construction, similar to that shown in FIG. 2 for a turbine blade, may be used for fixation of the blades in a compressor. Thus, the compressor blades may be formed from, say, a reinforced polymer material. The choice of materials in that case is easier in view of the lower temperatures involved. For this application, it may be desirable to carry the tube member through to the root assembly and to fix the end of the tube to the root assembly. In that case, a fail-safe, fall-back, load-bearing ability of the core member is available under severe overstrain conditions of the fixation which follows after failure of the tube member which would then occur at the point of attachment between the blade and the root member. It will be observed that this system can be subject to prestressing with the core members in tension. If the tube were to be directly attached to the metal root, failure would occur at the interface of the polymer and the root and if the tube means were not connected directly with the root, like the system illustrated in FIG. 2, failure would occur at the tube/polymer interface, near the root because of the local high shear stresses developed in this region. While this might be acceptable itself, without the presence of the core member of the duplex unit the ability of restricting the load carried by any one of the units (and the reinforced polymer in the vicinity) following tube failure and subsequent deformation in bending by pull-through of the core member would not be attainable.

Other applications of the invention are to anchorages for asbestos cement, or glass fibre, reinforced cement panels as exterior cladding for buildings.

I claim:

1. A support means for an artefact which is at least at times to be subjected to longitudinal shear stresses, comprising a support block, a tubular member fixed in a hole within said artefact, and an elongated sinuous or helical core member arranged within said tubular member to engage the inner wall surface of said tubular member and thereby being bonded interfacially to said wall surface, said tubular member extending at least to a point near the edge of said artefact, one end of said core member extending out of said hole and said core member being fixed to said support block, said tubular member contacting said support block so that shear stresses are transferred to said support block through said tubular member and said core member.

* * * * *